April 8, 1969　　　　G. C. GILLETTE　　　　3,437,925
CIRCUIT FOR CONVERTING RESISTANCE VALUES OF UNKNOWN RESISTOR
TO ELECTRICAL POTENTIAL SIGNAL FOR MEASUREMENT PURPOSES
Filed Oct. 23, 1965
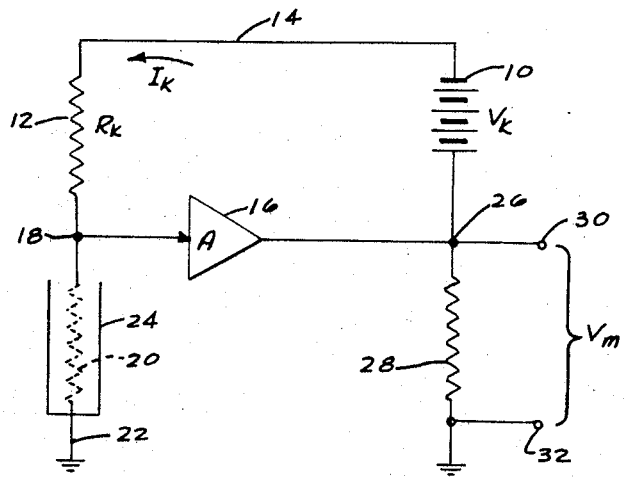
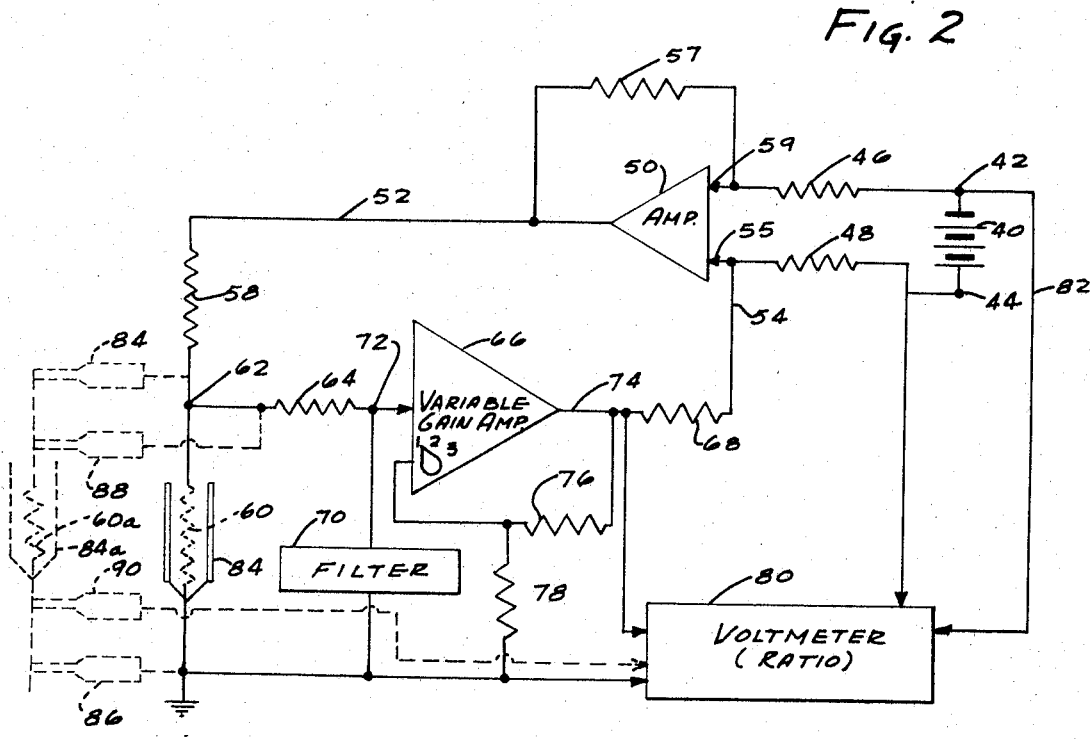
INVENTOR:
GARRY C. GILLETTE
BY: Nilsson, Robbins & Anderson
ATTORNEYS.

United States Patent Office 3,437,925
Patented Apr. 8, 1969

3,437,925
CIRCUIT FOR CONVERTING RESISTANCE
VALUES OF UNKNOWN RESISTOR TO
ELECTRICAL POTENTIAL SIGNAL FOR
MEASUREMENT PURPOSES
Garry C. Gillette, Costa Mesa, Calif., assignor to Dana
Laboratories, Inc., Irving, Calif., a corporation of
California
Filed Oct. 23, 1965, Ser. No. 503,390
Int. Cl. G01r 27/02
U.S. Cl. 324—62                                  6 Claims

ABSTRACT OF THE DISCLOSURE

An ohmmeter circuit is disclosed wherein a reference impedance is energized with a substantialy-constant, unreferenced potential, e.g. a battery, to receive a current that also passes through the resistor being tested. The return from the reference impedance to the battery is accomplished through an isolation amplifier and the voltage output from that amplifier manifests resistance because of the fixed nature of the reference impedance and the characteristic of the isolation amplifier. A circuit is also disclosed which incorporates differential-amplifier input to the reference impedance, A.C. filtering, a variable-gain isolation amplifier and a ratio voltmeter output.

---

This invention relates generally to ohmmeters and more particularly to a system that is somewhat independent of power fluctuations, for accurately measuring the resistance of an electrical resistor which can be effectively shielded during measurement.

In many different fields of electrical work, the need repeatedly arises for an accurate ohmmeter or instrument for measuring electrical resistance in ohms. One of the problems of prior meters of this type has been the difficulty of eliminating noise signals from the determination. That is, ohmmeters of the past generally have not provided a ground reference which could be extended as a barrier to effectively shield a resistor in process of measurement.

Another consideration in relation to prior ohmmeters has been the characteristics that variable currents from a power supply affect the measurement. That is, as a source of electrical current is loaded by an unknown resistor, the current is usually modified to some extent depending upon the resistance to be measured, and that variations has produced an error in measurements by prior art systems.

One other consideration relative prior ohmmeters is the need for a direct-reading unit that clearly manifests values and is substantially unaffected by independent variations in the source of power used with the system.

Accordingly, it is an object of the present invention to provide an improved ohmmeter that is accurate in operation, yet relatively economical to manufacture.

Another object of the present invention is to provide an improved ohmmeter which may be embodied to provide a ground reference potential and means connected thereto for shielding a resistor while it is being measured.

Still another object of the present invention is to provide an improved ohmmeter system which is somewhat independent of power supply output fluctuations.

A further object of the present invention is to provide an improved, direct reading ohmmeter system which is substantially immune to the presence of noise and power supply variations.

One further object of the present invention is to provide an improved ohmmeter system incorporating a reference resistor which receives a substantially constant potential difference so as to provide an established current which is then passed through the resistor under consideration to develop a signal indicative of the electrical resistance thereof.

Additional objects and advantages of the present invention will become apparent from a consideration of the following description taken in conjunction with the accompanying drawings which are presented by way of example only and are not intended as a limitation upon the scope of the present invention as defined in the appended claims, and in which:

FIG. 1 is a schematic circuit and block diagram illustrative of the operation of an embodiment of the present invention; and FIG. 2 is a schematic circuit and block diagram of an ohmmeter in accordance with the present invention.

Referring now more particularly to FIG. 1, there is shown a batery 10 for providing a voltage $V_k$ that is applied across a resistor 12 of fixed resistance $R_k$ through a conductor 14 and reference returned through a buffer amplifier 16. The junction point 18 between the resistor 12 and the amplifier 16 is adapted to be connected to a resistor 20, of unknown resistance which is the subject of measurement and is therefore indicated in phantom. The other end of the resistor 20 is adapted to be connected to a source of fixed ground-reference potential through a conductor 22 which is also connected to a noise shield 24 extending to somewhat enclose the resistor 20.

The junction point 26 between the amplier 16 and the battery 10 is connected to a ground referenced resistor 28. Terminals 30 and 32 are then connected to provide the signal $V_m$, that is developed across the resistor 28, for observation.

In the operation of the system, the battery 10 is assumed (at this stage of explanation) to provide a constant voltage $V_k$ across the fixed (or standard) resistor $R_k$. Therefore, a constant current $I_k$ may be considered to flow through the resistor 12, which current is also carried by the unknown resistor 20. That is, as the current $I_k$ through the resist or 12 is isolated from the junction point 26, by the buffer amplifier 16, it must flow through the resistor 20 to ground referenced potential. Therefore, a constant current $I_k$ flows through the unknown resistor 20. The voltage $V_m$ across the unknown resistor 20 is therefore indicative of the value of that resistor. That is, as the current $I_k$ represents a constant value, the voltage $V_m$ equals $KR_{20}$, where K is a constant. Therefore, the voltage $V_m$ can be employed directly to manifest the unknown resistance. Considering the accuracy of the system, a prime source of errors in prior systems has been noise picked up by the resistor being measured. In the present system, the shield 24 connected to ground effectively shields the resistor 20 from noise signals that would otherwise tend to create an error in the indicated value of the resistance. Furthermore, with regard to accuracy, it is to be noted that the resistance of the resistor 20 in hte circuit does not tend to alter the current $I_k$ to inturn vary the observed measurement. That is, as the voltage $V_m$ develops across the resistor 20 according to its resistance, the potential difference or voltage $V_k$ is accordingly adjusted to a different base operating level, preserving constant potential across the resisor 12. Therefore, the reference level of the voltage $V_k$ or base potential of the battery 10 adjusts depending on the resistance of the resistor 20. In this regard, the potential or voltage $V_m$ across the resistor 20 is always referenced to fixed ground potential for effective shielding as indicated. Thus, the system hereof is relatively simple yet is capable of accurate measurements, substantially uneffected by noise and unrelated to the resistance being measured. Another potential source of errors in measuring resistance is independent fluctuations in the power supply voltage. Test difficulty is avoided in the system of FIGURE 2.

Considering the ohmmeter system now of FIGURE 2, a more sophisticated form of the invention is represented. A battery 40 serves as a reference DC supply though it is to be understood that various other power supplies could certainly be employed. The positive and negative terminals 42 and 44 of the battery are connected through balanced resistors 46 and 48 respectively to the inputs of a differential amplifier 50. The amplifier 50 provides the reference voltage $V_k$ (for operation of the system) between the output conductor 52 and a feedback conductor 54 that is tied to the base level input 55 of the amplifier 50. The base level 55 is isolated from the battery terminal 44 by the resistor 48. A normal feedback circuit is provided from the output of the amplifier 50, through the resistor 57 back to the elevated or positive increment input 59 of the amplifier 50.

The output conductor 52 from the amplifier 50 is connected to a stable resistor 58 which is in turn connected to the unknown resistor 60 (shown in phantom). The junction point 62 between the resistors 58 and 60 is connected through a resistor 64 to a buffer or isolation amplifier 66, the output of which is returned to the base level input 55 of the amplifier 50 through a resistor 68. The differential amplifier 50 operates in the well-known balanced manner so that the input resistors 46 and 48 are balanced, as are the feedback resistors 57 and 68. In this regard, the feedback resistors 57 and 68 may be of substantially one half the value of the input resistors 46 and 48.

The fixed output of the amplifier 50 is thus applied across the reference resistor 58 and is preserved constant. The constant potential across the fixed resistor 58 produces the constant current as described which is forced to flow through the resistor 60 (of unknown value) to the ground potential.

In the isolation of the junction point 62 by the buffer amplifier 66 it may be important to bypass AC component signals, therefore, a filter 70 is connected from the junction point 72 between the resistor 64 and the input to the amplifier 66 to bypass AC signals to ground potential. Further regarding the buffer amplifier 66 a conventional feedback path from the output 74 back to the input is provided through a resistor 76, and the input is grounded through a resistor 78.

The output 74 from the buffer amplifier 66 in addition to providing a feedback base reference potential to the amplifier 50, also is connected to a voltmeter 80 that is referenced to ground potential and also connected through a conductor 82 to the terminal 42 of the battery 40. The voltmeter 80 operates to provide indications of voltage ratios and may take the form of any of a variety of well-known digital voltmeters.

In the operation of the system, the amplifier 50 provides a fixed potential across the resistor 58 to produce the desired constant current for application to the resistor 60 (of unknown value). The constant current so developed is blocked by the buffer amplifier 66 and therefore must flow through the resistor 60 (which is shielded from noise and the like by a shield 84) to a source of fixed ground referenced potential.

As a result of the current through the resistors 58 and 60, potential drops exist across each of the resistors. However, the potential drop across the resistor 58 is held fixed to preserve the fixed reference current by raising the base operating level of the amplifier 50 as described. That is, in one mode of operation, the voltage developed at the junction point 62 appears at the output 74 of the amplifier 66 (operating at unity gain) and is applied through the resistor 68 and the conductor 54 to the variable base level of operation for the amplifier 50. As a result, the differential amplifier 50 simply operates on an adjusted level, maintaining the potential across the resistor 58 fixed.

The voltage at the junction point 62 is substantially the voltage $V_{60}$ developed across the unknown resistor 60. As explained, the voltage $V_{58}$ across the reference resistor 58 is held substantially constant (coinciding to the voltage of the battery 40) therefore, the voltage $V_{60}$ is indicative of the resistance of the resistor 60. However, as indicated, the voltmeter 80 that is connected to receive the voltage $V_{60}$ from the output 74 operates in a ratio mode, indicating the voltage ratio $V_{60}/V_{58}$, or $IR_{60}/IR_{58}$. As the current through the resistors 58 and 60 is similar, the ratio may be considered $R_{60}/R_{58}$. As a result, if the resistance $R_{58}$ of the resistor 58 is scaled to "one" the indicated measurement is $R_{60/1}$ or the resistance of the resistor 60.

The advantage of the ratio mode of operation is that power-supply fluctuations are balanced out of the indicated resistance valves. That is, as the voltage developed by the battery 40 or the amplifier 50 varies, the voltage $V_{59}$ and $V_{60}$ vary proportionately so that the ratio of these voltages remains constant to indicate the resistance of the resistor 60. As a result, any deterioration of the voltage from the battery 40 or variation in the voltage output from the amplifier 50 does not effect the measureent of resistance.

As described above, the amplifier 66 functions to isolate the junction point 62, and to provide the voltage from the junction point 62 to the output 74. That is, the amplifier 66 has been described to operate as a unity-gain buffer amplifier. However, also as indicated, the amplifier 66 is actually a variable-gain amplifier, which characteristic provides several operating scales for the entire system. For example, if the system is to be employed to measure small resistance, the amplifier 66 can be adjusted to provide a gain of say, two. As a result, the operating scale is expanded (essentially doubled) for improved accuracy in reading. Of course, the stages and number of gain control variations may change depending upon the application contemplated for the system.

A further consideration which generally relates to the measurement of very small resistances arises as a result of the resistance and pickup in leads to probes, resistor leads, e.g. the connectors to the resistance of interest. In some instances the resistance of these connectors may be sizable in relation to the resistance of the unknown resistor which is to be measured. To reduce the effect of such external resistances on the actual measurement, a four-point probe arrangement may be provided including separate probes 84, 86, 88 and 90 (shown in phantom) for coupling circuit elements in the system directly to the resistor to be measured. These probes may take a variety of forms as well known in the prior art as for example shielded structures with very low resistance. The probe 84 is connected to the resistor 58 adjacent the junction point 62 and the probe 88 is similarly connected to the resistor 64. The probe 86 is connected to ground potential and the probe 90 is connected to the voltmeter 80.

In using the probes (as shown in phantom) in FIGURE 2, the junction point 62 is opened as is the ground bus to the voltmeter 80. As a result, the probe 84 connects the upper end of the resistor 60a (shown in phantom with a shield 84a) to the resistor 58, while the probe 88 connects the same end to the resistor 64. The lower end of the resistor 60a is connected to the voltmeter 80 by the probe 90, and to ground by the probe 86. To avoid confusion, these connections are also shown in phantom.

The basic philosophy of operation for the system is similar as shown by full symbols in FIGURE 2 and as shown in phantom. However, when the four-point probe is employed more accurate results are possible. Of course, various combinations of four-point probes can be physically arranged to conveniently accomplish the desired couplings.

What is claimed is:

1. An ohmmeter for measuring the value of an unknown resistor, comprising:
   a reference impedance;
   a junction point terminal connected to one end of said reference impedance;
   a source of substantially constant potential;
   an isolation amplifier connected in series with said source;
   means including said isolation amplifier and said source connected across said reference impedance for applying said substantially constant potential across said reference impedance, the input of said amplifier being connected to said terminal;
   means for coupling said unknown resistor between said terminal and a fixed level of reference potential, whereby said unknown resistor substantially carries the current passing through said reference impedance;
   an output resistor connected between a point intermediate said amplifier and said source and said fixed level of reference potential, for manifesting the potential level therebetween as an indication of the value of said unknown resistor.

2. An ohmmeter according to claim 1 wherein said means for applying said substantially constant potential across said reference impedance further includes a differential amplifier connected across said source for supplying said constant potential.

3. An ohmmeter according to claim 1 wherein said isolation amplifier comprises a variable gain amplifier for scaling the operation of said system.

4. An ohmmeter according to claim 1 further including shielding means connected to said fixed level of reference potential, for shielding said unknown resistor.

5. A system in accordance with claim 1, further including a ratio voltmeter means and means for connecting said ratio voltmeter means to indicate the ratio of the potential across said output resistor to said fixed unreferenced potential.

6. An ohmmeter according to claim 1 further including filter means for passing alternating-signal components, connected to by pass such components developed across said unknown resistor.

References Cited

UNITED STATES PATENTS

| | | | |
|---|---|---|---|
| 2,597,088 | 5/1952 | Dutilh | 324—62 XR |
| 2,606,230 | 8/1952 | Perry | 324—140 |
| 2,689,335 | 9/1954 | Aeschlimann | 324—62 |
| 2,829,334 | 4/1958 | Murnighan | 323—4 |
| 3,225,298 | 12/1965 | Cochran | 324—62 |
| 3,320,439 | 5/1967 | Widlar | 323—22 |

RUDOLPH V. ROLINEC, *Primary Examiner.*

E. E. KUBASIEWICZ, *Assistant Examiner.*